United States Patent
Dhiba et al.

(10) Patent No.: US 11,383,987 B2
(45) Date of Patent: Jul. 12, 2022

(54) PHOSPHOGYPSUM DECOMPOSITION PROCESS

(71) Applicant: OCP SA, Casablanca (MA)

(72) Inventors: Driss Dhiba, Casablanca (MA); Lhoussaine Omari, Safi (MA); Jamal Chaouki, Quebec (CA); Ahmad Mohaddespour, Quebec (CA)

(73) Assignee: OCP SA

( * ) Notice: Subject to any disclaimer, the term of this patent is extended or adjusted under 35 U.S.C. 154(b) by 124 days.

(21) Appl. No.: 16/766,500

(22) PCT Filed: Nov. 22, 2018

(86) PCT No.: PCT/MA2018/000019
§ 371 (c)(1),
(2) Date: May 22, 2020

(87) PCT Pub. No.: WO2019/103586
PCT Pub. Date: May 31, 2019

(65) Prior Publication Data
US 2020/0377375 A1    Dec. 3, 2020

(30) Foreign Application Priority Data

Nov. 22, 2017 (EP) .................................. 17203182

(51) Int. Cl.
| | | |
|---|---|---|
| *C01F 11/00* | (2006.01) | |
| *C01F 11/08* | (2006.01) | |
| *B01J 8/24* | (2006.01) | |
| *C01B 17/50* | (2006.01) | |

(52) U.S. Cl.
CPC .............. *C01F 11/08* (2013.01); *B01J 8/24* (2013.01); *C01B 17/506* (2013.01)

(58) Field of Classification Search
CPC ........... C01F 11/08; B01J 8/24; C01B 17/506; C01B 32/40
See application file for complete search history.

(56) References Cited

U.S. PATENT DOCUMENTS

| | | |
|---|---|---|
| 3,087,790 A | 4/1963 | Wheelock et al. |
| 3,607,045 A | 9/1971 | Wheelock et al. |
| 3,729,551 A | 4/1973 | Gorin |
| 4,102,989 A | 7/1978 | Wheelock |
| 4,216,197 A * | 8/1980 | Moss ................. C01F 11/10 423/638 |
| 4,503,018 A | 3/1985 | Gardner et al. |
| 5,433,939 A | 7/1995 | Wheelock |
| 6,024,932 A | 2/2000 | Paisley |

OTHER PUBLICATIONS

International Search Report from Application No. PCT/MA2018/000019 dated Feb. 11, 2019, 4 pages.

* cited by examiner

*Primary Examiner* — Steven J Bos
(74) *Attorney, Agent, or Firm* — Lerner, David, Littenberg, Krumholz & Mentlik, LLP

(57) ABSTRACT

The present invention relates to a process for decomposing calcium sulfate ($CaSO_4$) present in phosphogypsum (PG), comprising the following steps: a) providing a reactor containing phosphogypsum (PG) and a solid source of carbon (C), b) reacting a flow of dioxygen (Oz) with the source of carbon (C) so as to generate carbon oxide (CO), c) reacting carbon oxide (CO) obtained in step a) with calcium sulfate ($CaSO_4$) of the phosphogypsum to produce calcium oxide (CaO) and sulfoxide ($SO_2$) according to the following reaction: $CaSO_4 + CO \rightarrow CaO + SO_2 + CO_2$ wherein the mass ratio C/PG is between 0.2 and DA, and the mass ratio 15 $O_2$/PG is between 0.5 and 1.5.

9 Claims, 3 Drawing Sheets

(a)

(b)

PHOSPHOGYPSUM DECOMPOSITION PROCESS

CROSS-REFERENCE TO RELATED APPLICATIONS

The present application is a national phase entry under 35 U.S.C § 371 of International Application No. PCT/MA2018/000019 filed Nov. 22, 2018, which claims priority from European Application No. 17203182.5 filed Nov. 22, 2017, all of which are hereby incorporated herein by reference.

FIELD OF THE INVENTION

The invention relates to a method for decomposing phosphogypsum (PG), which is a byproduct of phosphoric acid production, to calcium oxide and sulfur dioxide.

BACKGROUND OF THE INVENTION

Phosphogypsum $CaSO_4.2(H_2O)$ is a by-product of phosphoric acid production using the wet process (which is the most commonly used process):

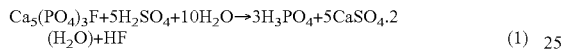

$$Ca_5(PO_4)_3F+5H_2SO_4+10H_2O \rightarrow 3H_3PO_4+5CaSO_4.2(H_2O)+HF \quad (1)$$

Calcium sulfate is then separated from the phosphoric acid by filtration.

Reaction (1) shows that a 5 moles by-product (PG) is produced when producing 3 moles of phosphoric acid, i.e., in order to produce large amounts of phosphoric acid, tons of PG have to be disposed of into the environment.

However, PG contains sulphur, which is purchased to produce sulphur dioxide used for sulphuric acid production. Note that in 2008, the price of sulphur increased from US $35/ton to US $840/ton.

Moreover, cement plants require CaO which is routinely provided by $CaCO_3$ decomposition at very high temperature. This process consumes high amounts of energy while yielding massive $CO_2$ emissions, which is the reason why cement factories would be very interested in buying the second product of the PG decomposition, CaO.

The PG (mainly $CaSO_4$ decomposition in air usually occurs at high temperature around 1400° C., which is significantly cost demanding according to the following reaction:

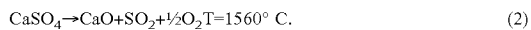

$$CaSO_4 \rightarrow CaO+SO_2+\tfrac{1}{2}O_2 \quad T=1560° C. \quad (2)$$

However, it can be decomposed using reductive atmosphere, e.g., under CO, at a lower temperature [1]:

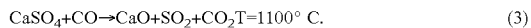

$$CaSO_4+CO \rightarrow CaO+SO_2+CO_2 \quad T=1100° C. \quad (3)$$

This process also requires considerable amounts of energy while producing another undesired by-product (calcium sulfide CaS) in reductive atmosphere:

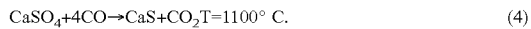

$$CaSO_4+4CO \rightarrow CaS+CO_2 \quad T=1100° C. \quad (4)$$

However, the PG decomposition process by reduction with pure CO [1, 2] or C-PG solid-solid reactions [3] is known. The considerable amounts of required energy are still an obstacle making this method economically infeasible.

In the following description, decomposition of phosphogypsum PG refers particularly to decomposition of $CaSO_4$.

BRIEF DESCRIPTION OF THE INVENTION

A goal of the invention is to provide an eco-efficient process by which the phosphogypsum decomposition leads simultaneously to a high PG conversion to CaO and $SO_2$ and low CaS yield while having a sufficient amount of energy for reaction.

Accordingly, the invention relates to a process for decomposing calcium sulfate ($CaSO_4$) present in phosphogypsum (PG), comprising the following steps:

a) providing a reactor containing phosphogypsum (PG) and a solid source of carbon (C), b) reacting a flow of dioxygen ($O_2$) with the source of carbon (C) so as to generate carbon oxide (CO), c) reacting carbon oxide (CO) obtained in step a) with calcium sulfate ($CaSO_4$) of the phosphogypsum to produce calcium oxide (CaO) and sulfoxide ($SO_2$) according to the following reaction:

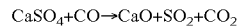

$$CaSO_4+CO \rightarrow CaO+SO_2+CO_2$$

wherein the mass ratio C/PG is between 0.2 and 0.4, and the mass ratio $O_2$/PG is between 0.5 and 1.5.

According to other optional features of the process:
the mass ratio C/PG is between 0.15 and 0.45, preferably approximately equal to 0.3;
the mass ratio $O_2$/PG is between 0.2 and 1, preferably approximately equal to 1;
the mass ratio $O_2$/C is between 1 and 3, preferably approximately equal to 2;
steps b) and c) are preferably carried out in a fluidized bed reactor;
step b) consists of injecting dioxygen ($O_2$) in the fluidized bed reactor so that the flow of dioxygen ($O_2$) is in contact with an assembly of phosphogypsum and carbon source in said fluidized bed reactor;
step c) is carried out at a temperature of 1100° C. or less;
the conversion of calcium sulfate ($CaSO_4$) is 80% or more, preferably 85% or more, while the yield of the side product (CaS) is 20% or less, preferably 15% or less.

BRIEF DESCRIPTION OF THE DRAWINGS

Further features and advantages of the invention will be apparent from the detailed description that follows, based on the appended drawings wherein.

DETAILED DESCRIPTION OF EMBODIMENTS OF THE INVENTION

Figure 1:
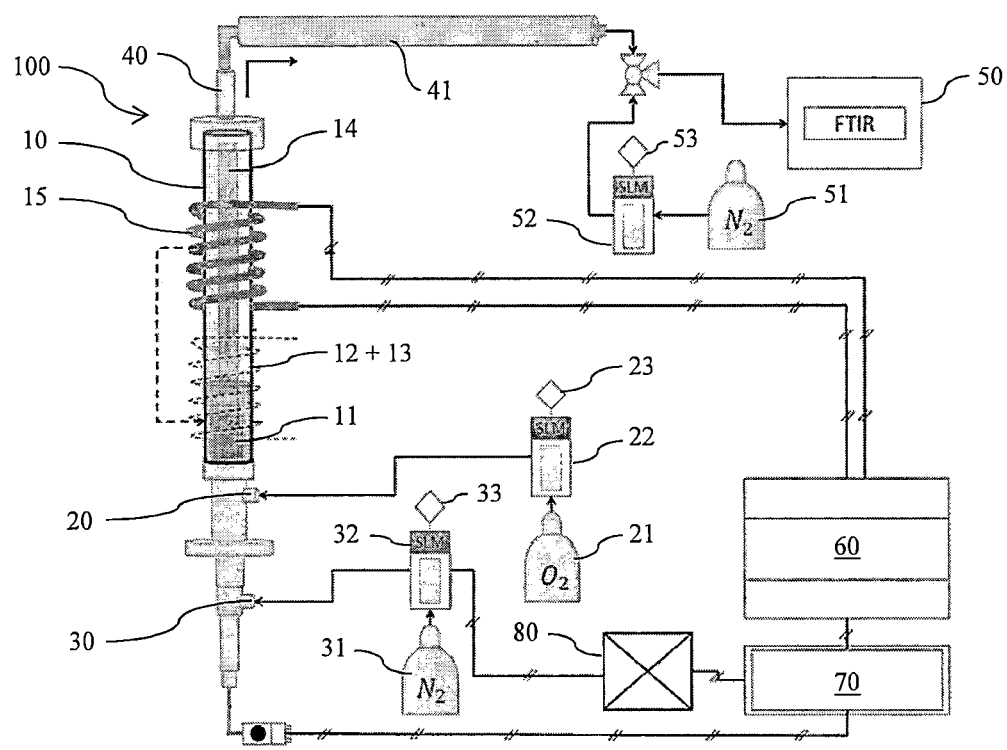
FIG. 1 illustrates an induced heated fluidized bed reactor scheme for gypsum decomposition experiments by carbon oxidation.

In order to decompose PG into CaO and $SO_2$, the proposed process combines PG with carbon (e.g., coal, coke, charcoal, or any source of carbon) while oxygen is injected to the fluidized bed reactor for carbon oxidation ($O_2$ under stoichiometry conditions). Preferably, a flow of oxygen $O_2$ comes into contact with an assembly of phosphogypsum and a solid source of carbon C.

The oxidation process not only provides the required amount of CO for gypsum decomposition at 1100° C., but also supplies the required energy.

However, the amount of released CO strongly depends on the $O_2$/C ratio.

As a result, the $O_2$/C ratio was found to be very critical in producing the optimum amounts of required CO.

On the other hand, to decompose all the PG, the C/PG ratio should be increased so that the heat production satisfies the required energy for the decomposition process.

The inventors have found $O_2$/C and C/PG ratios to target the highest PG decomposition to CaO and $SO_2$ while producing the minimum amount of CaS. However, the formed CaS can also be converted either to the usual products (CaO and $SO_2$) or to $CaSO_4$ undergoing its routine decomposition to CaO and $SO_2$.

Calcium sulfide decomposition can be performed in an oxidative environment at 1100° C. as mentioned in reactions (5) and (6):

$$CaS + 1.5O_2 \rightarrow CaO + SO_2 \quad (5)$$

$$CaS + 2O_2 \rightarrow CaSO_4 \quad (6)$$

The formed $CaSO_4$ will subsequently undergo the decomposition process by CO reduction. Therefore, by the proposed process, both oxidative and reductive reactions can take place simultaneously, without any demands for two different oxidative-reductive stages as suggested by [4].

Carbon as the source of energy under oxidizing conditions undergoes the two following reactions:

$$C + 0.5O_2 \rightarrow CO \quad (9)$$

$$C + O_2 \rightarrow CO_2 \quad (10)$$

where these reactions are exothermic.

Calcium sulfide does not directly react with carbon. However, CaS can be converted to CaO and $SO_2$ according to $$CaS + 3CO_2 \rightarrow CaO + SO_2 + 3CO \quad (11)$$

Among the products of reaction (11), CaO and CO do not react with CaS while $SO_2$ can react with CaS and produce $CaSO_4$:

$$CaS + 2SO_2 \rightarrow CaSO_4 + 2S \quad (12)$$

Then, various reactions can occur between CaS and $CaSO_4$, thereby leading to favorite solid and gas products:

$$3CaSO_4 + CaS \rightarrow 4CaO + 4SO_2 \quad (13)$$

$$CaSO_4 + 3CaS \rightarrow 4CaO + 4S \quad (14)$$

$$CaS + 3CaSO_4 + 4CO_2 \rightarrow 4CaCO_3 + 4SO_2 \quad (15)$$

$$CaS + 3SO_3 \rightarrow CaO + 4SO_2 \quad (16)$$

With sufficient amounts of carbon and controlled amounts of oxygen, carbon can produce the required amounts of energy and, simultaneously, the required amount of CO to initiate the $CaSO_4$ decomposition process. Therefore, in continuous streams of $CaSO_4$ and carbon, while oxygen is injected, all reactions occur with the heat provided by carbon combustion.

The present invention is illustrated in further detail below by non-limiting examples and embodiments.

Phosphogypsum (particle diameter $20 < d_p < 60$ µm, density$\approx$2.3 g|cm³) was provided by OCP CO., Morocco, which was analyzed by three methods: Neutron activation analysis (NAA) and X-ray photoelectron spectrometry (XPS) and the results are summarized accordingly in tables (5), (6), and (7), respectively.

Coal (particle diameter $20 < d_p < 60$ µm, as a source of carbon) was provided by Recommunity Inc., Canada, with the heating values 28,280 kJ/Kg and characterized by CHNS (determination of the mass fractions of carbon (C), hydrogen (H), nitrogen (N) and sulfur (S)) and NAA presented in tables (8) and (9), respectively.

Phosphogypsum and CaS decomposition experiments by carbon oxidation were performed in a novel, induced heated fluidized bed reactor that was able to be heated up to 1100° C. with 200° C./s. The scheme of a reaction device 100 comprising this reactor 10 is illustrated in FIG. 1.

The reactor 10 comprises a gas inlet 20 from which oxygen $O_2$ (reacting gas) is supplied to the reactor. An oxygen source 21 in communication with a digital flow controller 22 powered by a power supply 23 allows to control the flow of oxygen $O_2$ being introduced into the reactor 10.

Similarly, the reactor 10 comprises a gas inlet 30 from which nitrogen $N_2$ (carrier gas) is supplied to the reactor. A nitrogen source 31 in communication with a digital flow controller 32 powered by a power supply 33 allows to control the flow of nitrogen being introduced into the reactor 10.

The gases leave the reactor via the gas outlet 40 which comprises a thermal and/or electrical insulation 41.

An analysis device 50, such as an FTIR spectrometer (Fourier Transform InfraRed) can be used to analyze the gases leaving the reactor, in order to collect data from which infrared spectrum, emission spectrum or absorption spectrum, for example, are obtained. A nitrogen source 51 in communication with a digital flow controller 52 powered by a power supply 53 are provided for this purpose.

The reactor 10 is formed of a tube, preferably made of alumina, loaded with sand 11, and phosphogypsum 12 and coal 13, prior to the reaction. Within the reactor 10, stainless steel vertical rods 14 are fixed to a plate. A metal coil 15, preferably a copper coil, is wrapped around the tube of the reactor 10 and supplied with energy by an induction heating power supply 60. The temperature is the reactor is controlled by a temperature controller 70. The reaction device 100 is advantageously provided with a Data Acquisition System 80 (DAS or DAQ) for sampling signals of various experimental parameters and converting them into computer processable values.

The flow of nitrogen $N_2$ and oxygen $O_2$ with predetermined rates fluidize the material inside the tube so that it provides the minimum fluidization conditions, which is achieved by synchronizing the flow rates and the temperature inside the reactor 10 measured by thermocouples. However, the ratio between nitrogen $N_2$ and oxygen $O_2$ is kept constant by the digital flow controller 22. The current flow (which changes direction with a very high frequency) in the metal coil 15 induces a magnetic field so that the direction of said magnetic field also changes with a very high frequency. The stainless steel rods 14 act as conductors where the current is induced by the magnetic field. As a consequence, heat is released by Joule effect inside the tube of the reactor 10 surrounded by the metal coil 15.

Example 1—Optimum Carbon and for PG Decomposition to $SO_2$ and CaO

Carbon oxidation provides the required CO to react with PG at 1100° C. according to:

$$CaSO_4 + CO \rightarrow CaO + SO_2 + CO_2 \quad T=1100° C. \quad (3)$$

However, the following undesired reaction also takes place at 1100° C., indicating an optimum requirement for CO concentration:

$$CaSO_4 + 4CO \rightarrow CaS + CO_2 \quad T=1100° C. \quad (4)$$

Phosphogypsum decomposition under CO has a noticeable benefit, which is reducing the operating temperature from 1560 to 1100° C. and, thus, reducing energy consumption to maintain the reactor at this temperature.

However, keeping the reactor at 1100° C. requires a large amount of energy, which renders this process economically impractical.

Usually CO can be produced from different sources, such as steam reforming (from natural gas) or coal/biomass oxidation. In the latter case, coal oxidation by purging $O_2$ (below stoichiometry) into the reactor where both PG and coal are present, can lead to producing CO, $CO_2$, and $H_2O$ from which the produced CO can be controlled by the $O_2$ amount fed into the reactor. On the other hand, carbon gasification can produce a lot of energy, thereby supplying the required heat for PG decomposition under CO. However, an optimum $O_2$ is required to produce enough amounts of CO, otherwise PG decomposition under CO will yield CaS production instead of $SO_2$ and CaO according to reaction (4).

In order to find the optimum amounts of carbon and $O_2$ for PG decomposition to SO2 and CaO, two limiting factors should be considered: (i) $SO_2$ and CaO to be maximized, and (ii) ΔH<0. When ΔH=0, the produced energy from carbon oxidation and exothermic reactions is balanced with endothermic reaction energy requirements and, thus, at this steady-state point, no energy is required to maintain the decomposition process at 1100° C. This optimization is performed in two steps: (i) finding the C/PG ratio to maximize $SO_2$ and CaO in the downstream, and (ii) finding the required $O_2$ to yield Ali<0.

Figure 2:
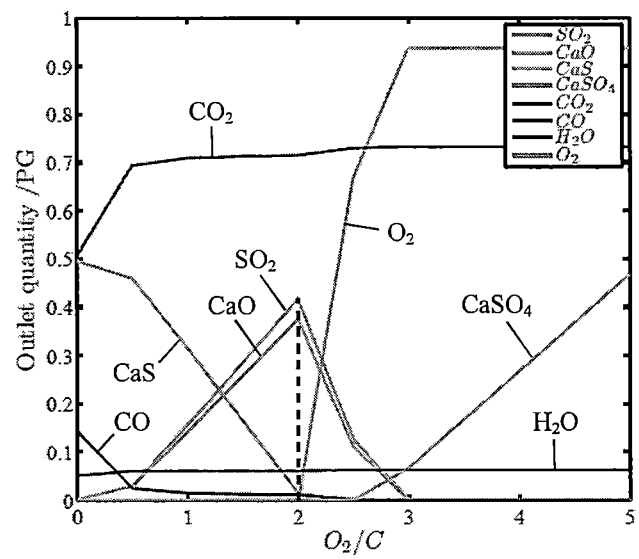
FIG. 2 shows FactSage™ simulation results for PG decomposition by carbon oxidation (C/PG≈0.2) at 1100° C.: (a) outlet quantities scaled with PG inlet the vertical dashed line represents $O_2$/C≈2 in which $SO_2$ and CaO are maximum; (b) ΔH—the vertical dashed line is the same as (a) corresponding to $O_2$/C≈2, and horizontal dashed line represents the energy requirement ΔH≈−0.87 MJ/kg PG for complete PG decomposition to $SO_2$ and CaO with a ratio $O_2$/C≈2.
Figure 2:
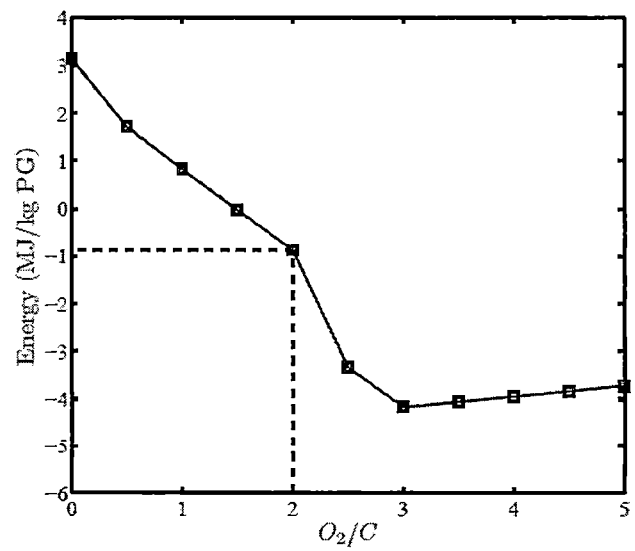
Figure 3:
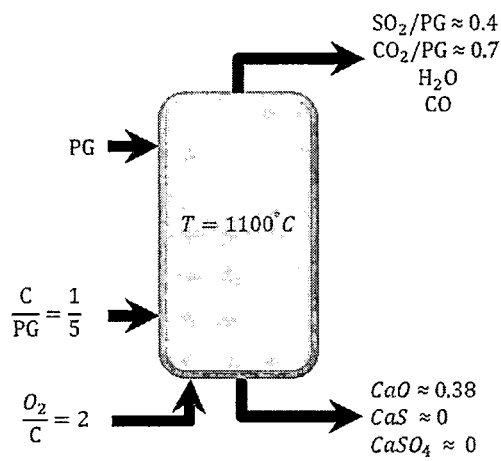
FIG. 3 shows an embodiment of the process for PG decomposition and the solid outlet treatment by carbon oxidation obtained by 500 simulation runs in FactSage™ (all ratios are by mass)

FIGS. 2 and 3 summarize simulation results with FactSage software at equilibrium for optimum carbon C and $O_2$ required to provide a sufficient amount of CO and heat by carbon oxidation. According to these results, ratios $O_2/C \approx 2$ and $C/PG \approx 0.2$ were obtained.

To provide the required carbon and $O_2$, $C/PG \approx 0.2$, 0.3, and 0.4 were selected in order to optimize $SO_2$ and CaO production while $O_2/PG$ was changed from 0.5 to 1 and 1.5. The initial conditions of the fluidized bed experiments are summarized in Table 1. In the following two steps, C/PG and $O_2/PG$ ratios were optimized to maximize $SO_2$ and CaO productions. Note that coal was used as a source of carbon in all experiments.

Note that in simulations, only the carbon content of coal was considered in the calculations.

TABLE 1

Inlet properties of fluidized bed experiments in the induced heated fluidized bed reactor illustrated in FIG. 1 at 1100° C.

| Inlet property | C/PG | | |
|---|---|---|---|
| | 0.2 | 0.3 | 0.4 |
| PG (g) | 5 | 4.62 | 4.29 |
| C (g) | 1 | 1.38 | 1.71 |
| $O_2$/PG | 0.5, 1, 1.5 | 0.5, 1, 1.5 | 0.5, 1, 1.5 |

The remaining solid after the decomposition process with carbon oxidation was analyzed by XPS and the results are summarized in Table 2. The mole fractions of components from XPS analysis are also summarized in Tables 3 and 4.

To explain the experimental results, three series of reactions should be considered:

1—C-PG (Solid-Solid)

$$2CaSO_4 + C \rightarrow 2CaO + 2SO_2 + CO_2 \quad (17)$$

$$CaSO_4 + 4C \rightarrow CaS + 4CO \quad (18)$$

2—C—$O_2$ (Solid-Gas)

$$C + 0.5O_2 \rightarrow CO \quad (19)$$

$$C + CO_2 \rightarrow 2CO \quad (20)$$

$$C + O_2 \rightarrow CO_2 \quad (21)$$

3—PG-CO (Solid-Gas)

$$CaSO_4 + CO \rightarrow CaO + SO_2 + CO_2 \quad (3)$$

$$CaSO_4 + 4CO \rightarrow CaS + CO_2 \quad (4)$$

C/PG varies with constant $O_2$/PG ($\approx$1) (table 3): When C/PG$\approx$0.2, $O_2$/PG$\approx$1 yields less CO production (reaction (20) rather than reaction (19)) than the optimum required value, because the optimum $O_2$/PG ratio ($\approx$1) occurs only when C/PG$\approx$0.3. Therefore, reaction (17) is dominant and CaO yield would be larger than that of CaS, however, PG conversion is not complete due the lack of CO production. Moreover, CaS is produced from reactions (17) and (18). Note that C/PG$\approx$0.2 is quite high for reaction (18) to be dominant with respect to reaction (17). As a result, however, CaS s not considerably produced from reaction (4), it appears by reaction (18).

When C/PG$\approx$0.3, $O_2$/PG$\approx$1 provides sufficient $O_2$ to be at optimum CO production by C—$O_2$ reactions. Therefore, reaction (21) is dominant with respect to reaction (22) and CaO is favorably produced. However, CaS is not produced in large amounts from reaction (21), it is produced from reaction (18) because C/PG$\approx$0.3 provides enough carbon to favor reaction (18). Overall, when C/PG$\approx$0.3, CaS is higher than that of C/PG. Since for both conditions reaction (4) is not dominant but (3) is, CaS is more abundantly produced from reaction (18) due to the higher carbon content. Note that CaS is also produced in small amounts from reaction (4) for both conditions, which is higher when C/PG$\approx$0.3, because $O_2$/PG$\approx$1 whereas the CaS production is very sensitive to the optimum $O_2$/PG ratio, i.e., small deviations from this ratio will result in CaS production. Therefore, when C/PG$\approx$0.2, $O_2$/PG$\approx$1 is producing CO beyond this critical point.

Finally, when C/PG$\approx$0.4, $O_2$/PG$\approx$1 yields higher CO production than optimum by reaction (19) resulting in producing CaS by a dominantly occurring reaction (4). However, CaS is also considerably produced by reaction (18) due to the very high carbon content.

$O_2$/PG varies with constant C/PG≈2≈0.3 (table (4)): When C/PG≈0.3, CaS production by solid-solid reactions is assumed to be the same. When $O_2$/PG≈0.5, 1, and 1.5, CO production is high, optimum, and low, respectively, to optimize CaO production while avoiding CaS formation. Therefore, when $O_2$/PG≈1.5, CaS is negligibly present in the solid product while $O_2$/PG≈0.5 yields the highest CaS production according to reaction (4).

The CaS production in a series of experiments is the lowest when either the $O_2$/PG is high or C/PG is low because under these circumstances, reactions (18) and (4) are fairly avoided. On the other hand, this CaS minimization is followed by a lower PG conversion. Thus, in order to maximize PG conversion and CaO yield, C/PG≈0.3 at $O_2$/PG≈1 is concluded. Note that under these circumstances, CaS yield is still considerable. Therefore, a separate process for CaS removal is required.

TABLE 2

PG conversion, CaO yield, and CaS yield (corresponding to each cell from left to right) in a fluidized bed reactor at 1100° C. with the initial conditions summarized in Table 1 and XPS analysis summarized in Tables 3 and 4.

| | $O_2$/PG | | |
|---|---|---|---|
| C/PG | 0.5 | 1 | 1.5 |
| 0.2 | | 0.85, 0.64, 0.09 | |
| 0.3 | 0.93, 0.63, 0.23 | 0.97, 0.78, 0.16 | 0.89, 0.73, 0.06 |
| 0.4 | | 0.96, 0.59, 0.34 | |

TABLE 3

The effects of C/PG ratio on the remaining solid composition in a fluidized bed reactor at 1100° C. with the initial conditions summarized in Table 1 when $O_2$/PG ≈ 1 by XPS analysis.

| C/PG | $CaSO_4$ (mol. %) | CaO (mol. %) | CaS (mol. %) | PG conversion (%) | CaO yield (%) | CaS yield (%) |
|---|---|---|---|---|---|---|
| 0.2 | 15 | 75 | 10 | 85 | 64 | 9 |
| 0.3 | 3 | 80 | 17 | 97 | 78 | 16 |
| 0.4 | 4 | 61 | 35 | 96 | 59 | 34 |

TABLE 4

The effects of $O_2$/PG ratio on the remaining solid composition in a fluidized bed reactor at 1100° C. with the initial conditions summarized in Table 1 when C/PG ≈ 0.3 by XPS analysis.

| $O_2$/PG | $CaSO_4$ (mol. %) | CaO (mol. %) | CaS (mol. %) | PG conversion (%) | CaO yield (%) | CaS yield (%) |
|---|---|---|---|---|---|---|
| 0.5 | 7 | 68 | 25 | 93 | 63 | 23 |
| 1 | 3 | 80 | 17 | 97 | 78 | 16 |
| 1.5 | 11 | 82 | 35 | 89 | 73 | 6 |

Figure 4:
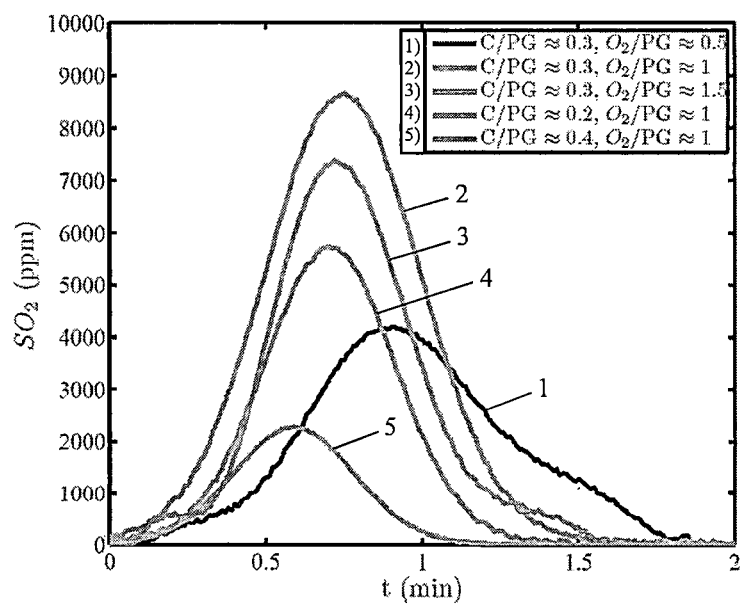
FIG. 4 shows the production of $SO_2$ from PG decomposition by carbon oxidation in the induction fluidized bed reactor at 1100° C. with a total sample amount of 6 g, for various C/PG and $O_2$/PG ratios.

The $SO_2$ formation patterns from all the performed experiments in the fluidized bed reactor are shown in FIG. 4.

Obviously, the maximum $SO_2$ production occurs when $O_2$/PG≈1 and C/PG≈0.3. Higher amounts of either carbon or oxygen hinder $SO_2$ formation (by producing CaS) while lower amounts result in partial $CaSO_4$ conversion and, thus, less desired gaseous products.

Consequently, based on simulation and preliminary experimental results, PG decomposition into $SO_2$ and CaO by carbon oxidation is feasible. Carbon oxidation will produce optimum CO while supplying the required energy for the decomposition process. Moreover, there is also a possibility of removing the produced by-product, CaS, during the PG decomposition process by carbon gasification in another fluidized bed reactor, which will be considered in future work. Similar to the PG decomposition process, a solid outlet containing $CaSO_4$, CaO, and CaS can be converted to only CaO by optimizing carbon and $O_2$ in the second reactor. Depending on the required purity, a third reactor can be installed next to the second reactor.

TABLE 5

NAA results for pure PG.

| Element | (ppm) | Element | (ppm) | Element | (ppm) | Element | (ppm) |
|---|---|---|---|---|---|---|---|
| U | 3.48 | V | 6.15 | Cd | 1.91 | Ni | 13.6 |
| Ti | 129 | Cl | 20.8 | Au | <0.0005 | Ag | 1.96 |
| Sn | <24 | Al | 865 | Hf | <0.282 | Sc | 0.223 |
| I | <0.5 | Ca | 242291 | Ba | 82.3 | Rb | <0.8 |
| Mn | 0.954 | S | 167001 | Br | 0.185 | Fe | 137 |
| Mg | <88 | Se | 1.34 | As | 0.432 | An | 13.3 |
| Cu | <8 | Mo | <0.3 | Sb | 0.197 | Co | <0.1 |
| In | <0.01 | Hg | 0.303 | W | <0.6 | K | <57000 |
| Si | <6100 | Th | 0.908 | Zr | 49.2 | La | 61.8 |
| Na | 1457 | Cr | 9.37 | Cs | <0.06 | | |

TABLE 6

Identification of chemical bonding in pure phosphogypsum from high resolution scans by XPS.

| Element | Binding energy (eV) | Component | Relative atomic (%) |
|---|---|---|---|
| Ca | 347.5 | $Ca(OH)_2$, CaO | 2.1 |
| | 348.6 | $CaSO_4$, CaO | 9.8 |
| O | 530.9 | $Ca(OH)_2$, CaO | 5.9 |
| | 532.4 | $CaSO_4$, CaO | 43.2 |
| | 533.2 | $H_2O$ | 28.1 |
| S | 167.1 | $R-SO_3$ | 0.8 |
| | 169.5 | $CaSO_4$ | 10.1 |

TABLE 7

Mass percentage of components in pure phosphogypsum by XPS.

| Component | Mass % | Atomic % |
|---|---|---|
| $CaSO_4$ | 88.7 | 88.7 |
| $Ca(OH)_2$ | 11.3 | 11.3 |

TABLE 8

Coal characterization by CHNS, and NAA used in simulation, TGA, and fluidized bed experiments.

| Compound | wt. % min | wt. % max |
|---|---|---|
| C | 71.5 | 72 |
| H | 4.8 | 5.0 |
| N | 1.7 | 1.8 |
| S | 1.3 | 2.2 |
| O | 8.5 | 8.9 |
| Cl ppm | 369 | 407 |

TABLE 9

NAA results for pure coal provided by Recommunity Inc., Canada.

| Element | (ppm) | Element | (ppm) | Element | (ppm) | Element | (ppm) |
|---|---|---|---|---|---|---|---|
| U | 1.33 | V | 39 | Cd | <0.25 | Ni | 17.4 |
| Ti | 633 | Cl | 341 | Au | <0.0018 | Ag | <0.42 |
| Sn | <53 | Al | 13980 | Hf | 0.76 | Sc | 3.2 |
| I | <3 | Ca | 1379 | Ba | 101 | Rb | 14 |
| Mn | 55 | S | 17455 | Br | 3.2 | Fe | 12982 |
| Mg | 880 | Se | 3.5 | As | 26 | An | 26 |
| Cu | <64 | Mo | 46.4 | Sb | 0.61 | Co | 6.3 |
| In | <0.01 | Hg | 0.059 | W | 0.48 | K | 2326 |
| Si | <40000 | Th | <1 | Zr | 39 | La | 8 |
| Na | 342 | Cr | 18 | Cs | 3.1 | | |

REFERENCES

[1] U.S. Pat. No. 3,087,790.
[2] U.S. Pat. No. 6,024,932.
[3] U.S. Pat. No. 4,503,018.
[4] U.S. Pat. No. 5,433,939.

The invention claimed is:

1. A process for decomposing calcium sulfate ($CaSO_4$) present in phosphogypsum (PG), comprising the following steps:
   a) providing a reactor containing phosphogypsum (PG) and a solid source of carbon (C),
   b) reacting a flow of dioxygen ($O_2$) with the source of carbon (C) so as to generate carbon monoxide (CO),
   c) reacting carbon monoxide (CO) obtained in step b) with calcium sulfate ($CaSO_4$) of the phosphogypsum to produce calcium oxide (CaO) and sulfur dioxide ($SO_2$) according to the following reaction:

$$CaSO_4 + CO \rightarrow CaO + SO_2 + CO_2$$

wherein the mass ratio C/PG is between 0.2 and 0.4, and the mass ratio $O_2$/PG is between 0.5 and 1.5.

2. The process of claim 1, wherein the mass ratio C/PG is approximately equal to 0.3.

3. The process of claim 1, wherein the mass ratio $O_2$/PG is approximately equal to 1.

4. The process of claim 1, wherein the mass ratio $O_2$/C is between 1 and 3.

5. The process of claim 1, wherein steps b) and c) are carried out in a fluidized bed reactor.

6. The process of claim 5, wherein step b) consists of injecting dioxygen ($O_2$) in the fluidized bed reactor so that the flow of dioxygen ($O_2$) is in contact with mixture of phosphogypsum and carbon source in said fluidized bed reactor.

7. The process of claim 1, wherein step c) is carried out at a temperature of 1100° C. or less.

8. The process of claim 1, wherein the conversion of calcium sulfate ($CaSO_4$) is 80% or more, and wherein the decomposing of calcium sulfate produces less than 20% of calcium sulfide as a side product.

9. The process of claim 1, wherein the mass ratio $O_2$/C is approximately equal to 2.

* * * * *